G. POLLOCK.

METHOD OF MAKING SHOES.

APPLICATION FILED APR. 21, 1919.

Reissued June 15, 1920. 14,882.

INVENTOR
G. POLLOCK

BY F. M. Wright,

ATT'Y

UNITED STATES PATENT OFFICE.

GEORGE POLLOCK, OF SAN FRANCISCO, CALIFORNIA.

METHOD OF MAKING SHOES.

14,882. Specification of Reissued Letters Patent. Reissued June 15, 1920.

Original No. 1,290,654, dated January 7, 1919, Serial No. 237,284, filed May 29, 1918. Application for reissue filed April 21, 1919. Serial No. 291,634.

*To all whom it may concern:*

Be it known that I, GEORGE POLLOCK, a citizen of the United States, residing at San Francisco, in the county of San Francisco and State of California, have invented new and useful Improvements in Methods of Making Shoes, of which the following is a specification.

The object of my invention is to provide a method of making shoes which will be less expensive than those heretofore used in the amount of capital required for the manufacture, in the cost of labor employed, and in the amount of material consumed, and which will result in the formation of a more comfortable shoe than those made by previous methods.

Figure 1:
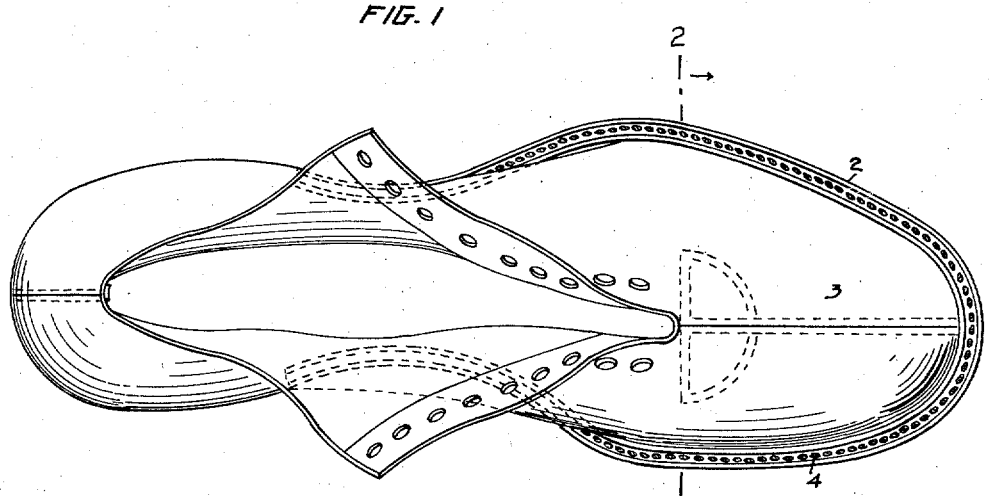
Figure 2:
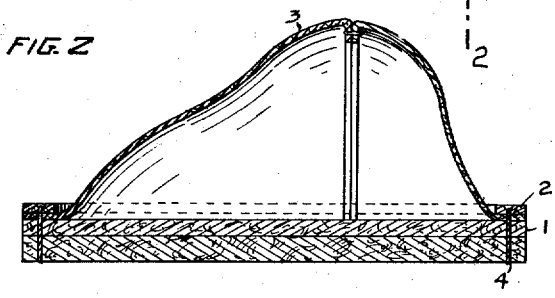
Figure 3:
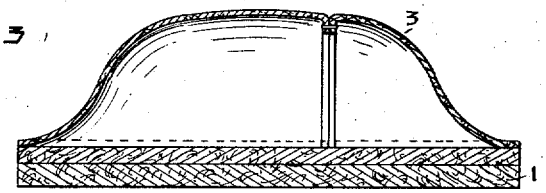
Figure 4:
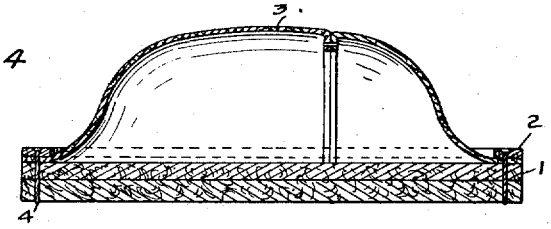

In the accompanying drawing, Figure 1 is a plan view of a shoe made according to my improved method; Fig. 2 is an enlarged cross sectional view on the line 2—2 of Fig. 1; Fig. 3 is a similar view illustrating the first stage in the manufacture of the shoe; Fig. 4 is a similar view illustrating the second stage thereof.

My improvement refers only to the making of the front portion of the shoe, the rear portion being made according to methods now in use.

I first cut out the sole 1 and I also form an upper without molding, lasting, or stretching the leather of the upper in any manner whatever. The first operation in so forming the upper is to cut inner and outer upper sections $3^a$, $3^b$ of flat pieces of leather and of proper shape in that the inner longitudinal edges of these sections are curved convexly to each other at their extreme front portions, so that, when said inner edges are stitched together, thereby forming a hollow body having a longitudinal seam 5, while the rear portion of said seam slopes gently downward toward the toe portion of the upper, the downward inclination of said seam increases more and more as it extends forwardly, until at an extreme front portion it becomes approximately vertical. The sections $3^a$, $3^b$, are unequal in width, the inner section $3^a$ being the narrower, so that said seam extends in a direct line between the toe and the heel. They are carefully cut of such form and size that, when they are so stitched together, the free marginal portion of the upper so formed can be laid down with the under side downward, so that its edge, laid flat on the sole, and without being turned inward as in lasting an upper to a sole, exactly registers with the edge of the sole, and that the volume then inclosed by the upper and sole is substantially that of the foot to be fitted.

Having prepared inner and outer sections $3^a$, $3^b$, of the proper size and shape as above explained, they are stitched together along their inner longitudinal edges to form the seam 5, and the joined blanks are then inverted, so that the seam 5 extends inwardly into the upper 3. I then place the upper thus formed upon the sole so that its edge exactly registers with the edge of the sole, and I cement the under side of a marginal portion of the upper of a width of about one-quarter of an inch to the upper side of a marginal portion of the sole of the same width. I then secure, by stitching 4, said welt 2 to the marginal portion of the upper 3 and the marginal portion of the sole 1 thus cemented together. The formation of the front portion of the shoe is then completed. The heel portion of the shoe is made by turning in or under upon the heel the leather forming the upper part of the shoe and securing thereto a counter in the usual manner.

A last is inserted in the shoe to raise the front portion of the upper to the proper shape.

It will therefore be seen that by my improved process I effect a saving in material used for making the upper, since the said material is not so wide as before, the use of an insole and six machines, namely, (1) the grooving machine, which cuts the groove in the insole, (2) the lasting machine, which is used for stretching the upper over the last, (3) the welting machine, which is used to secure together the welt, upper and insole, (4) the welt beating machine, (5) the welt trimming machine, (6) the rough rounding machine. I use a stitching machine for stitching the welt, upper and sole together, but that is also used in prior methods, and I use an edge trimming machine for trimming the edge of a compound sole formed by the welt, upper and sole.

It will readily be seen that this method of making shoes requires less capital in the installation of machinery, less labor, because there are fewer machines to operate, and less material, since the blanks from which the upper is formed are cut the exact size required, and there is no loss in trimming off the edge of the upper.

It is obvious that an inferior form of my improved method would be to cut the upper of such form that it would extend slightly within the edge of the sole, but not too much so as to prevent the succeeding steps of the process being carried out according to my invention; or apart from that it would extend a certain definite distance, say, a quarter of an inch, beyond the edge of the sole when placed thereon and then proceeding according to my method, and trimming off the portion of the upper projecting beyond the sole. I do not consider these methods as departures from my invention. As to the last named I do not consider such projecting portion to constitute any part of the upper, proper, but a mere superfluous extension thereof.

I claim:—

The method of forming a shoe which consists of forming a sole and upper sections having the extreme front portions of their inner edges curved convexly toward each other, said sections being of such size and form that their outer edges can exactly register with the edge of the sole, and that, when their outer edges so register and their outer marginal portions rest with inner surfaces next adjacent to the sole, and their inner edges are stitched together, they inclose with the sole a space substantially of the size of the foot to be fitted, then so stitching together said marginal portions and the sole so registering with said edges, and then shaping the upper to the final form.

GEORGE POLLOCK.